US011410801B2

(12) United States Patent
Song et al.

(10) Patent No.: US 11,410,801 B2
(45) Date of Patent: Aug. 9, 2022

(54) THERMALLY PROTECTED METAL OXIDE VARISTOR

(71) Applicant: Dongguan Littelfuse Electronics Company Limited, Dongguan (CN)

(72) Inventors: Dongjian Song, Dongguan (CN); Libing Lu, Dongguan (CN)

(73) Assignee: Dongguan Littelfuse Electronics Company Limited, Dongguan (CN)

( * ) Notice: Subject to any disclaimer, the term of this patent is extended or adjusted under 35 U.S.C. 154(b) by 0 days.

(21) Appl. No.: 17/268,352

(22) PCT Filed: Aug. 16, 2018

(86) PCT No.: PCT/CN2018/100801
§ 371 (c)(1),
(2) Date: Feb. 12, 2021

(87) PCT Pub. No.: WO2020/034139
PCT Pub. Date: Feb. 20, 2020

(65) Prior Publication Data
US 2021/0319934 A1    Oct. 14, 2021

(51) Int. Cl.
*H01C 7/12* (2006.01)
*H01C 1/02* (2006.01)
(Continued)

(52) U.S. Cl.
CPC ............... *H01C 7/12* (2013.01); *H01C 1/02* (2013.01); *H01C 1/14* (2013.01); *H01C 17/00* (2013.01)

(58) Field of Classification Search
CPC . H01C 7/12; H01C 17/00; H01C 1/02; H01C 1/14
See application file for complete search history.

(56) References Cited

U.S. PATENT DOCUMENTS 6,430,019 B1 *   8/2002   Martenson ............. H01C 7/126
                                                        361/103
7,483,252 B2 *   1/2009   de Palma ............... H01C 7/112
                                                        361/127
(Continued)

FOREIGN PATENT DOCUMENTS

CN          101261893 A     9/2008
WO          2012171221 A1   12/2012

OTHER PUBLICATIONS

International Search Report and Written Opinion dated May 22, 2019 for PCT/CN2018/100801 filed Aug. 16, 2018.

*Primary Examiner* — Kyung S Lee
(74) *Attorney, Agent, or Firm* — KDB Firm PLLC (57) ABSTRACT

Provided herein are thermally protected varistor (TPV) devices including a varistor body and a terminal assembly directly coupled together. The terminal assembly may include a housing, wherein an opening is provided in a base of the housing. A lead is coupleable with the varistor body via a thermal linking material positioned within the opening of the base, the thermal linking material operable to maintain direct physical contact with the lead when the thermal linking material is below a melting point. The terminal assembly may further include a shield slidable within the housing between a first position and a second position, wherein in the first position the shield is positioned adjacent the thermal linking material, and in the second position the shield is positioned between the lead and the second side of the varistor body. The shield includes a tab for releasably coupling the shield to the housing.

18 Claims, 9 Drawing Sheets

(51) Int. Cl.
    *H01C 1/14*           (2006.01)
    *H01C 17/00*         (2006.01)

(56) References Cited

U.S. PATENT DOCUMENTS

| | | | | |
|---|---|---|---|---|
| 8,836,464 | B2* | 9/2014 | Wang | H01T 1/14 |
| | | | | 337/5 |
| 9,537,304 | B2* | 1/2017 | Mao | H02H 9/041 |
| 9,570,260 | B2* | 2/2017 | Yang | H01H 61/02 |
| 2012/0050936 | A1* | 3/2012 | Douglass | H01C 7/12 |
| | | | | 361/111 |
| 2012/0105191 | A1* | 5/2012 | Wang | H01T 1/14 |
| | | | | 337/414 |
| 2015/0171622 | A1* | 6/2015 | Lee | H01C 7/126 |
| | | | | 361/93.7 |
| 2015/0280420 | A1* | 10/2015 | Mao | H01C 7/126 |
| | | | | 361/91.2 |

* cited by examiner

THERMALLY PROTECTED METAL OXIDE VARISTOR

FIELD OF THE DISCLOSURE

The disclosure relates generally to the protection of electrical and electronic circuits and equipment from power surges and, more particularly, to a thermally-protected varistor having a thermally actuated disconnect.

BACKGROUND OF THE DISCLOSURE

Over-voltage protection devices are used to protect electronic circuits and components from damage due to over-voltage fault conditions. These over-voltage protection devices may include metal oxide varistors (MOVs) that are connected between the circuits to be protected, and a ground line. MOVs have a specific current-voltage characteristic that allows them to be used to protect such circuits against catastrophic voltage surges. Typically, these devices utilize spring elements, which can melt during an abnormal condition to form an open circuit. In particular, when a voltage that is larger than the nominal or threshold voltage is applied to the device, current flows through an MOV, which generates heat. This causes the linking element to melt. Once the link melts, an open circuit is created, which prevents the MOV from catching fire.

However, these existing circuit protection devices do not provide an efficient heat transfer from the MOV to the spring element, thereby delaying response times, and subjecting the MOV to periodic transient voltages and overvoltage conditions, which apply further electrical stress. As a result of these stresses MOV's tend to degrade over time resulting in higher leakage current. At the end of their electrical lives, MOV's tend to fail catastrophically. End-of-life failures come in various forms. Failure due to fragmentation caused by excessive transient voltage is one type of end-of-life failure. Another failure type is thermal runaway caused by either degradation of the MOV and/or a sustained abnormal overvoltage condition. A thermal disconnect is used to open the device in the event of sustained overvoltage or thermal runaway due in part to the aforementioned electrical stresses noted above. It is desirable to have the thermal disconnect mechanism in very close proximity to the MOV disk so that thermal response time is as fast as possible. Therefore the purpose of a thermal disconnect MOV is to provide for relatively benign failure when subjected to conditions leading to thermal runaway.

Although thermally protected varistors are presently available, the currently available thermal disconnect varistors comprise complicated assemblies and are costly to manufacture. Another drawback of known approaches of thermally protected varistors is that they are one-time use components that must be replaced once the thermal disconnect has been triggered.

Thus, there presently exists a need for an efficiently-constructed varistor for protecting sensitive electrical circuits and equipment from abnormal overvoltage transients that can be easily maintained and serviced. It is with respect to these and other considerations that the present improvements are provided.

SUMMARY OF THE DISCLOSURE

A TPV device according to one approach may include a varistor body, including a first side and a thermal electrode disposed along a second side opposite the first side, wherein a first lead is electrically connected to the first side and a second lead is electrically connected to the thermal electrode. The TPV device may further include a terminal assembly directly coupled to the second side of the varistor body, the terminal assembly including a housing including a sidewall and a base, wherein an opening is provided in the base. The terminal assembly may further include a third lead coupleable with the second side of the varistor body via a thermal linking material positioned within the opening of the base, the thermal linking material operable to maintain direct physical contact with the third lead when the thermal linking material is below a melting point. The terminal assembly may further include an arc shield movable within the housing between a first position wherein the arc shield is positioned adjacent the thermal linking material, and a second position wherein the arc shield is positioned between the third lead and the second side of the varistor body, and wherein the arc shield includes a tab for releasably coupling the arc shield to the housing.

A TPV device according one embodiment of the disclosure may include a varistor body having a first side, and a second side opposite the first side. A thermal electrode is disposed along the second side, wherein a first lead is electrically connected to the first side and a second lead is electrically connected to the thermal electrode. The TPV device may further include a terminal assembly directly coupled to the second side of the varistor body, the terminal assembly including a housing including a sidewall and a base, wherein an opening is provided in the base. The terminal assembly may further include a third lead coupleable with the second side of the varistor body via a thermal linking material positioned within the opening of the base, the thermal linking material operable to maintain direct physical contact with the third lead when the thermal linking material is below a melting point. The terminal assembly may further include a shield slidable within the housing between a first position and a second position, wherein in the first position the shield is positioned adjacent the thermal linking material and in the second position the shield is positioned between the third lead and the second side of the varistor body, and wherein the shield includes a tab for releasably coupling the shield to the housing.

A method for assembling a thermally protected varistor (TPV) device may include providing a varistor body including a first side and a second side opposite the first side, wherein a thermal electrode is disposed along the second side, and wherein a first lead is electrically connected to the first side and a second lead is electrically connected to the thermal electrode. The method may further include directly coupling a terminal assembly to the second side of the varistor body, the terminal assembly including a housing having a sidewall and a base, wherein an opening is provided in the base. The method may further include positioning a shield within the housing adjacent a thermal linking material, wherein the thermal linking material is connected to the thermal electrode, and wherein the shield is releasably coupled to the housing by a tab. The method may further include connecting a third lead with the second side of the varistor body via a thermal linking material positioned within the opening of the base, the thermal linking material operable to maintain direct physical contact with the third lead when the thermal linking material is below a melting point. The method may further include coupling a cover of the housing to the sidewall and the base, wherein a detachment member of the cover biases the tab of the shield to detach the shield from the housing.

BRIEF DESCRIPTION OF THE DRAWINGS

The accompanying drawings illustrate exemplary approaches of the disclosed embodiments so far devised for the practical application of the principles thereof, and in which.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Furthermore, for clarity, some reference numbers may be omitted in certain drawings.

DETAILED DESCRIPTION

Embodiments in accordance with the present disclosure will now be described more fully hereinafter with reference to the accompanying drawings. The system/circuit may be embodied in many different forms and should not be construed as being limited to the embodiments set forth herein. Rather, these embodiments are provided so that this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of various components and their constituent parts. Said terminology will include the words specifically mentioned, derivatives thereof, and words of similar import.

As used herein, an element or operation recited in the singular and proceeded with the word "a" or "an" should be understood as not excluding plural elements or operations, unless such exclusion is explicitly recited. Furthermore, references to "one embodiment" of the present disclosure are not intended to be interpreted as excluding the existence of additional embodiments that also incorporate the recited features.

Furthermore, in the following description and/or claims, the terms "on," "overlying," "disposed on" and "over" may be used in the following description and claims. "On," "overlying," "disposed on" and "over" may be used to indicate that two or more elements are in direct physical contact with each other. However, "on,", "overlying," "disposed on," and over, may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

As will be described in greater detail below, the TPV device may include a plastic housing base assembly equipped with three specially shaped wires and at least one through hole. A first and second pin can be soldered onto the MOV electrode using high melting solder to fix the MOV, while a third pin may be directly soldered on the MOV electrode via the hole of the base with low melting solder, which is able to melt under abnormal overvoltage condition in a relatively short period of time. An arc shielding slider with one or two compression spring, is moveable in the housing base by a spring force. In some embodiments, the shielding slider has a snapping feature, such as a tab or a clamp, which can be secured to the base. A cover of the TPV device may include two posts, which can push or depress the snapping feature, thus releasing the spring and the shielding slider to a working position.

At least the following advantages are possible with the embodiments of the present disclosure. First, the TPV device provides high reliability under abnormal overvoltage condition because of the spring force from the compression spring. Second, the TPV device provides a very fast response to overheating due to direct soldering onto the metallization layer of ceramic. Third, the TPV device provides robust disconnection due to the compression spring and the moveable shielding slider. Fourth, one housing base module can match different disk thicknesses, therefore covering many voltage ratings for one disk size platform. Fifth, the manufacturing process of the TPV device may be simplified with only three soldering joints, therefore providing high unit-per-hour (UPH) automation. Sixth, the TPV device provides an in-line pin configuration with flexible pin pitch and pin length.

As will be apparent herein, the TPV device of the present disclosure can address the problems of the prior art, namely high cost and low reliability, by forming a highly reliable open circuit using a ceramic fuse coupled with a spring terminal. During an overheating event caused by an abnormal overvoltage condition, the TPV device can protect the circuit from damage.

Figure 1:
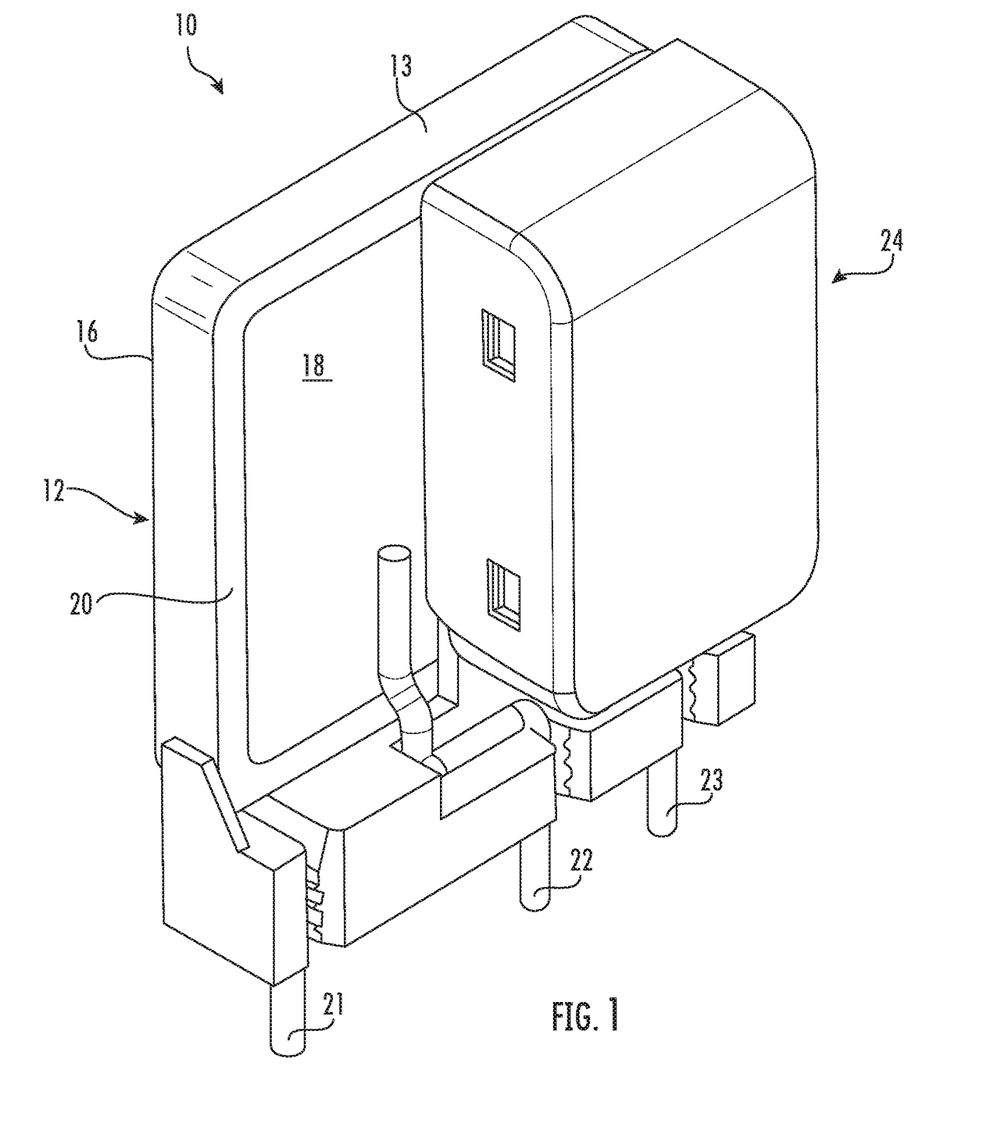
FIG. 1 is a perspective view of a TPV device according to embodiments of the present disclosure.

Turning now to FIG. 1, TPV assembly/device 10 for use with an electrical circuit according to embodiments of the disclosure will be described. As shown, the TPV device 10 includes a varistor body 12, which in this embodiment has a rectangular or cuboid shape defined generally by an outer perimeter 13. The varistor body 12 includes a first side 16, and a thermal electrode 18 disposed along a second side 20. A first lead 21 is electrically connected to the first side 16, while a second lead 22 is electrically connected to the thermal electrode 18. In some embodiments, the thermal electrode 18 is a metallization layer of ceramic, silver, copper, aluminum, or copper plus aluminum. The first lead 21 and the second lead 22 may be secured to respective first and second sides 16, 20 using a high-temperature solder. A third lead 23 may also be coupled to the varistor body 12, as will be described in further detail below. The varistor body 12 is directly coupled with a terminal assembly 24. Although not shown, the TPV device 10 may be encased/surrounded by a conformal epoxy or other high isolation material.

Figure 2:
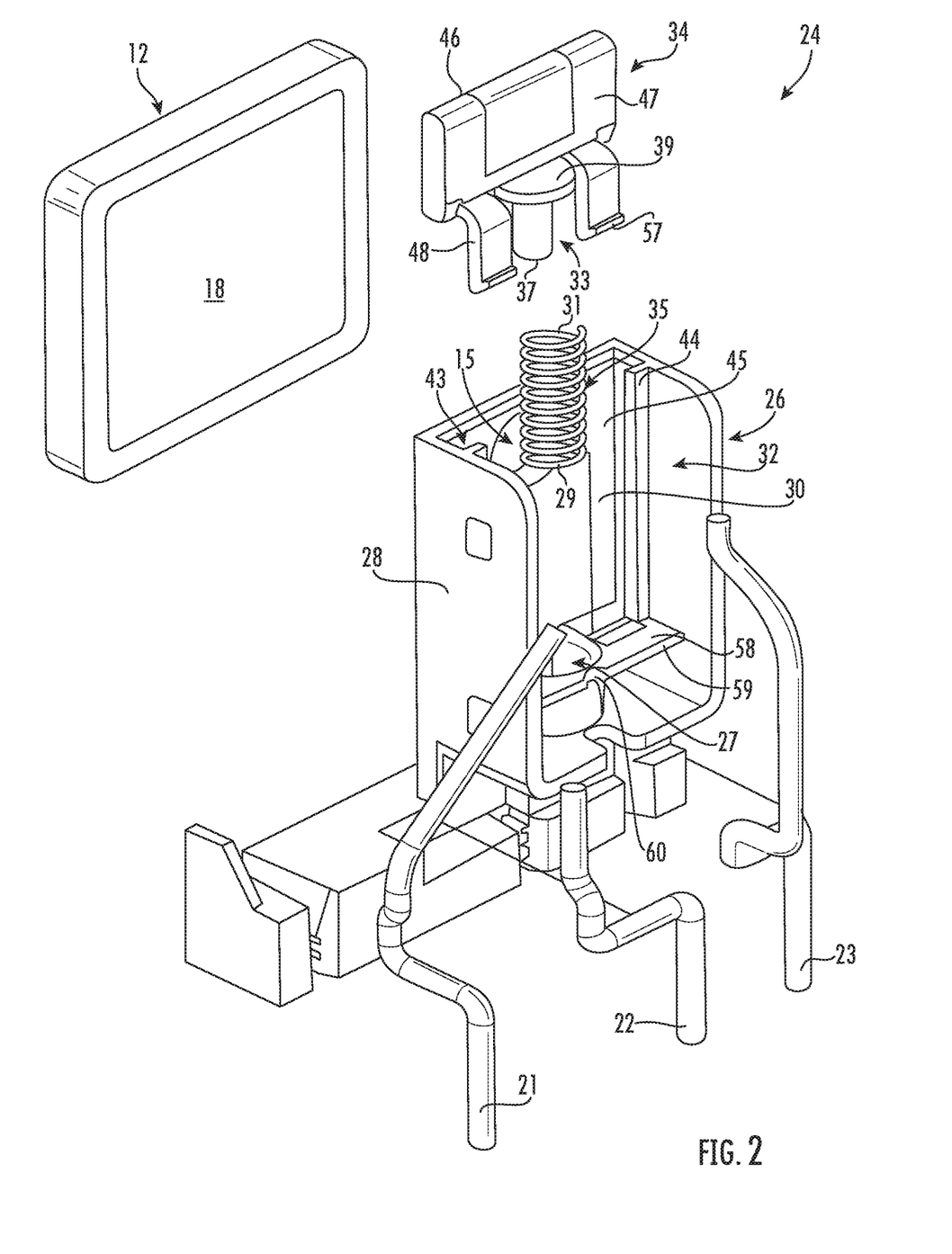
FIG. 2 is an exploded perspective view of the TPV device of FIG. 1 according to embodiments of the present disclosure.
Figure 3:
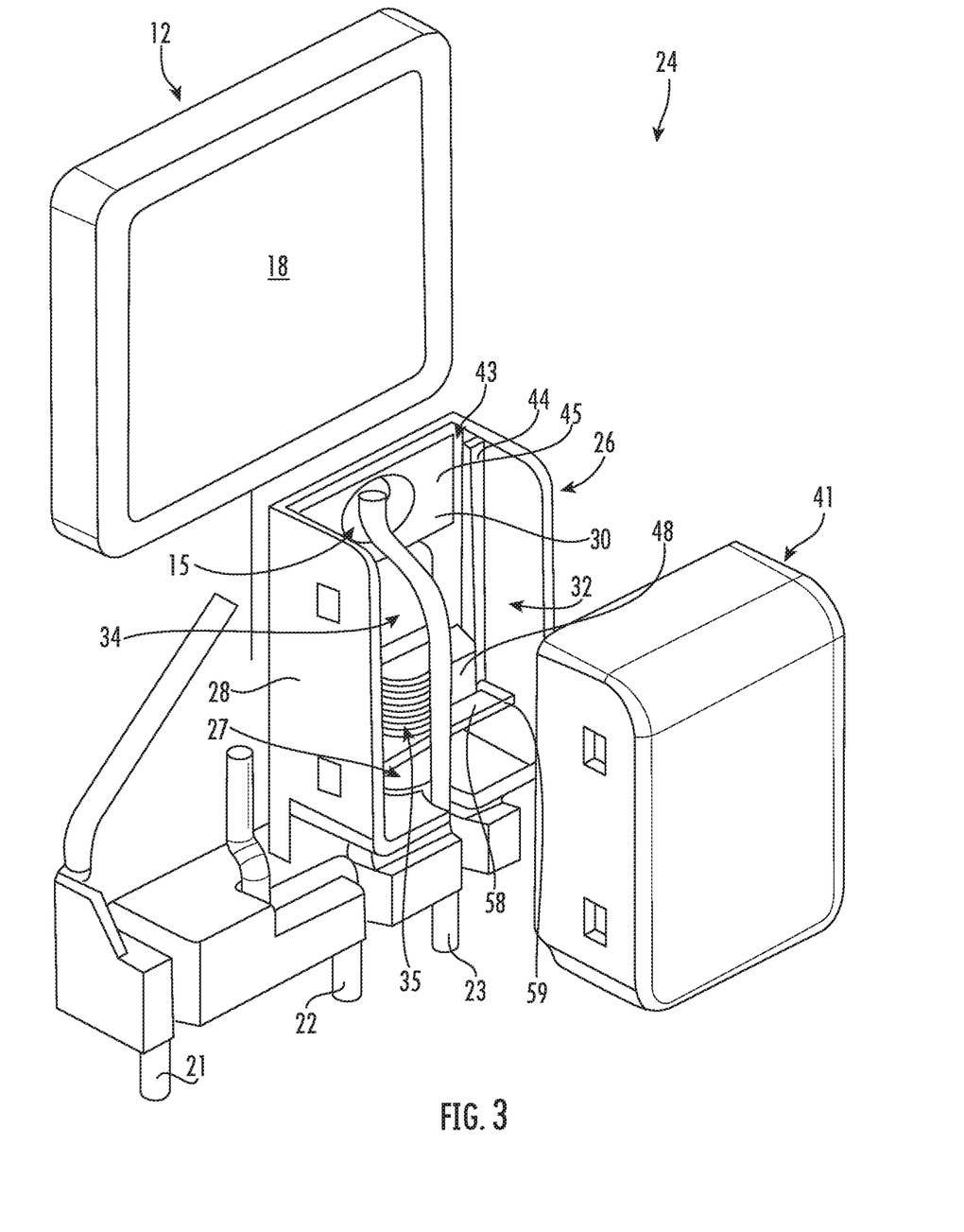
FIG. 3 is an exploded perspective view of the TPV device of FIG. 1 according to embodiments of the present disclosure.

As shown in FIGS. 2-3, the terminal assembly 24 coupled to the varistor body 12 will be described in greater detail. In some embodiments, the terminal assembly 24 includes a housing 26 having a sidewall 28, a base 30, and a cover 41 (FIG. 3), wherein the sidewall 28 generally extends around the perimeter of the housing 26. The sidewall 28 and the base 30 define a central cavity 32 containing a spring element 35 therein. The base 30 of the housing 26 may include an opening 15 provided therein for access to the thermal electrode 18 of the varistor body 12.

In the non-limiting embodiment shown, the spring element 35 is a single helical spring positioned within a channel 27 of the housing 26. As best shown in FIG. 2, the spring element 35 may include a first end 29 disposed within the channel 27, and a second end 31 coupled to an arc shield slider (hereinafter "shield") 34. In some embodiments, the spring element 35 may be disposed around a post 33 of the shield 34. The post 33 may include a shaft 37 and a base 39, wherein the second end 31 of the spring element 35 is directly in abutment with the base 39 to provide a spring force against the shield 34.

In exemplary embodiments, the shield 34 may be a substantially rectangular plate formed of an electrically non-conductive material such as plastic, glass, ceramics or a composition thereof. The shield 34 may be dimensioned to be freely slidable within a slot 43 of the base 30 of the housing 26. The slot 43 may be defined by a partial wall 44 extending into the central cavity 32 from the sidewall 28 and an inner surface 45 of the base 30 of the housing 26. A first main side 46 of the shield 34 may be in abutment with the inner surface 45, while a second main side 47 of the shield 34 may be in abutment with the partial wall 44.

The shield 34 may further include one or more engagement members 48 extending parallel, or substantially parallel, to the shaft 37 of the post 33. In the non-limiting embodiment shown, the engagement members 48 include a bent portion and a straight portion. As such, the engagement members 48 may each be a cantilevered element made of an elastic or resilient material. However, no single configuration is dispositive. As shown, the engagement members 48 may each include a protrusion or tab 57 extending from a free end thereof. During assembly, the engagement members 48 of the shield 34 couple with an intermediate wall 58 extending from the sidewall 28 and from the base 30. The intermediate wall 58 may include one or more openings 59 for receiving the tabs 57 therein. The tabs 57 include one or more surfaces configured to engage with an engagement surface of the intermediate wall 58. In some embodiments, the intermediate wall 58 may include a notch 60 to receive and position the third lead 23. Once the engagement members 48 of the shield 34 pass through the openings 59, as shown in FIG. 3, and the spring element 35 is compressed, the shield 34 is secured into a first, pre-working position.

Figure 4:
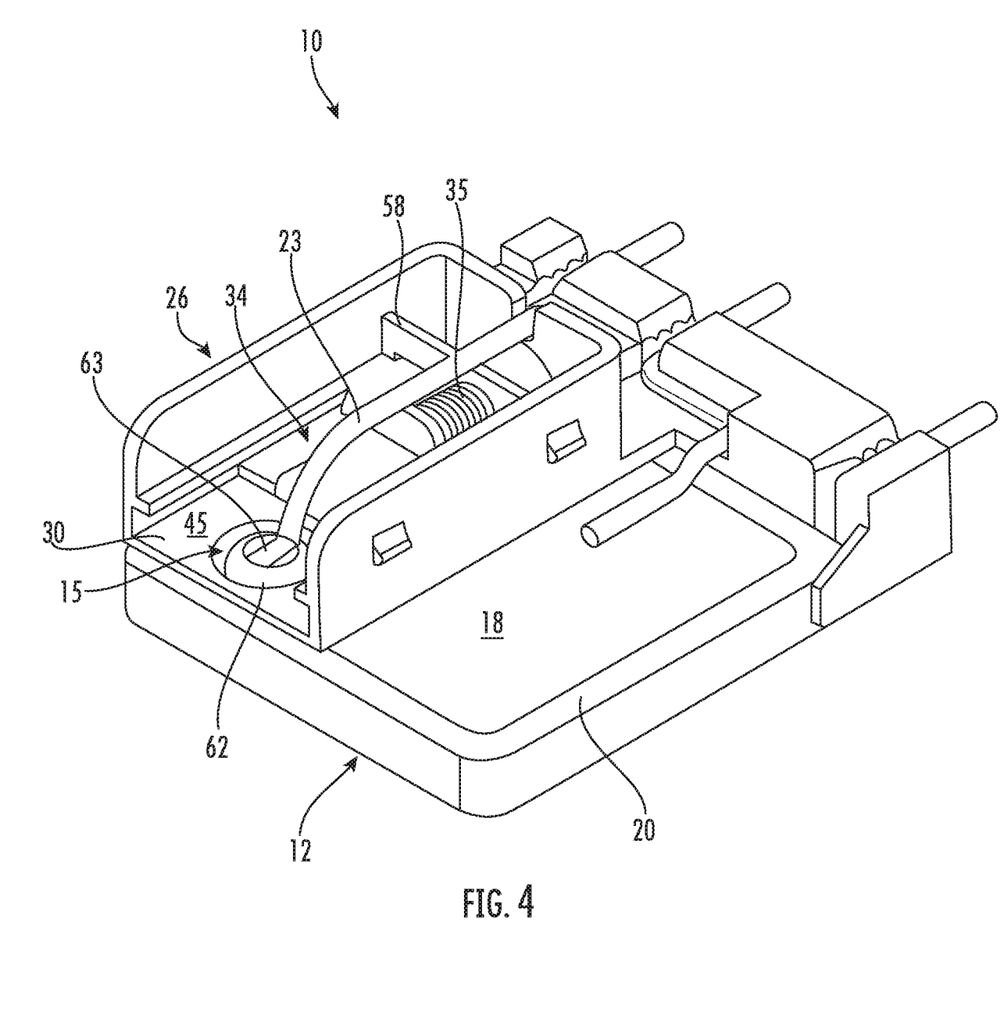
FIG. 4 is a perspective view of a terminal assembly of the TPV device of FIG. 1 according to embodiments of the present disclosure.

Turning now to FIG. 4, the device 10 according to embodiments of the present disclosure will be described in greater detail. As shown, the third lead 23 is coupleable with the second side 20 of the varistor body 12 via a thermal linking material 62 (e.g., a low temperature solder). The thermal linking material 62 may be positioned within the opening 15 of the base 30 of the housing 26. The thermal linking material 62 is operable to maintain direct physical contact with the third lead 23 when the thermal linking material 62 is below a melting point. Should the thermal linking material 62 exceed the melting point, for example, in the event of an over-voltage condition, the third lead 23 will detach and move away from the varistor body 12, thus causing the third lead 23 to disconnect from a power supply. In some embodiments, the third lead 23 may be a spring material fulcrumed by the intermediate wall 58. As the thermal linking material 62 begins to loosen, a free end 63 of the third lead 23 moves away from the base 30 of the housing 26. In exemplary embodiments, separation of the third lead 23 from the thermal electrode 18 is facilitated by the shield 34 physically moving in between the thermal linking material 62 and the third lead 23 as the shield 134 is biased away from the intermediate wall 58 by the spring force of the spring element 35.

In some embodiments, the shield 34 is configured to engage or abut the thermal linking material 62 when the thermal linking material 62 is above the melting point. For example, the thermal linking material 62 may extend above a plane defined by the inner surface 45 of the base 30 of the housing 26. Due to the spring force of the spring element 35, the shield 34 is biased towards the free end 63 of the third lead 23 once the tabs (not shown) of the engagement members 48 are disengaged from the intermediate wall 58. The material and dimensions of the thermal linking material 62 may be selected to adequately resist the force from the shield 34 and the spring element 35 so that the shield 34 remains in the first position until such time that the thermal linking material 62 is heated above its melting point and softens. Once the thermal linking material 62 becomes soft, the shield 34 begins to move into a second position wherein the shield 34 is positioned between the third lead 23 and the second side 20 of the varistor body 12, thus creating an insulating gap therebetween.

Figure 5:
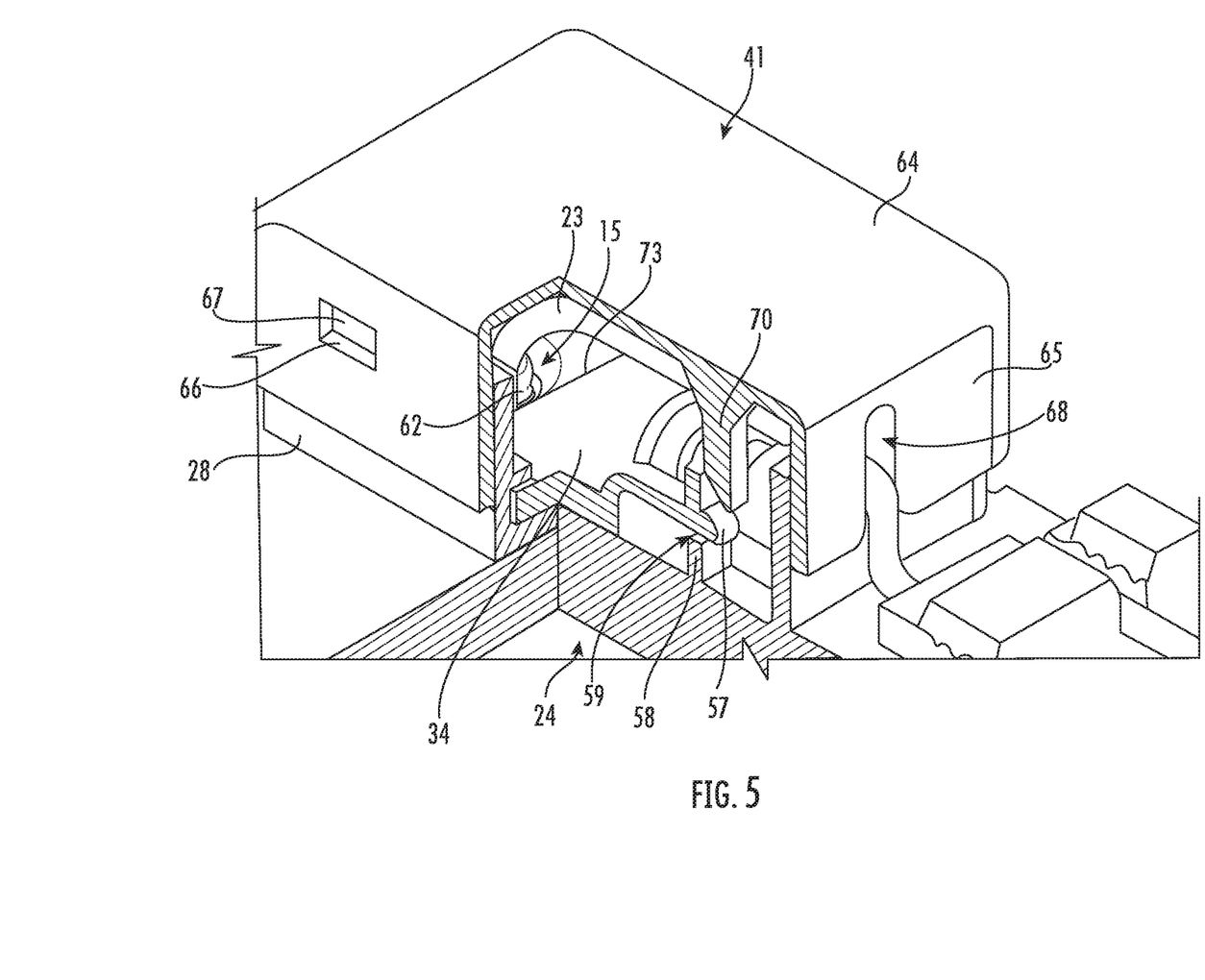
FIG. 5 is a partial cutaway view of the terminal assembly of the TPV device of FIG. 1 according to embodiments of the present disclosure.

Turning now to FIG. 5, operation of the terminal assembly 24 and the cover 41 according to embodiments of the present disclosure will be described in greater detail. As shown, a portion of the cover 41 has been cutaway for ease of viewing internal components of the terminal assembly 24. The cover 41 may include a main wall 64 and a cover sidewall 65. In some embodiments, the cover sidewall 65 may include one or more first openings 66 operable to engage a tab 67 of the sidewall 28 of the housing 26 for securing the cover 41 to the sidewall 28. The cover 41 may also include a second opening 68 operable to receive the third lead 23 therein. During assembly, the cover 41 may be secured in place after soldering the third lead 23 and the thermal linking material 62 to the varistor body 12.

The cover 41 may further include a detachment member 70 extending from the main wall 64. As shown, the detachment member 70 may be a device extending into the central cavity of the housing 26. The detachment member 70 is operable to engage the tab 57 of the engagement member 48 to release the shield 34 from engagement with the intermediate wall 58 of the housing 26. More specifically, as the cover 41 is attached to the sidewall 28, the detachment member 70 depresses the tab 57 and the engagement member 48 towards the base 30 of the housing 26. The tab 57 is disengaged from the intermediate wall 58, and positioned within the opening 59 of the intermediate wall 58. The spring element 35 may then cause the tab 57 to pass through the opening 59 and towards the thermal linking material 62.

The shield 34 and the spring element 35 are now in a first/working position in which a leading edge 73 of the shield may be engaged or abut the thermal linking material 62. In the event of an over-voltage condition, the shield 34 may slide to a second position in which the opening 15 in the base 30 is physically and electrically covered by the shield 34.

Figure 6:
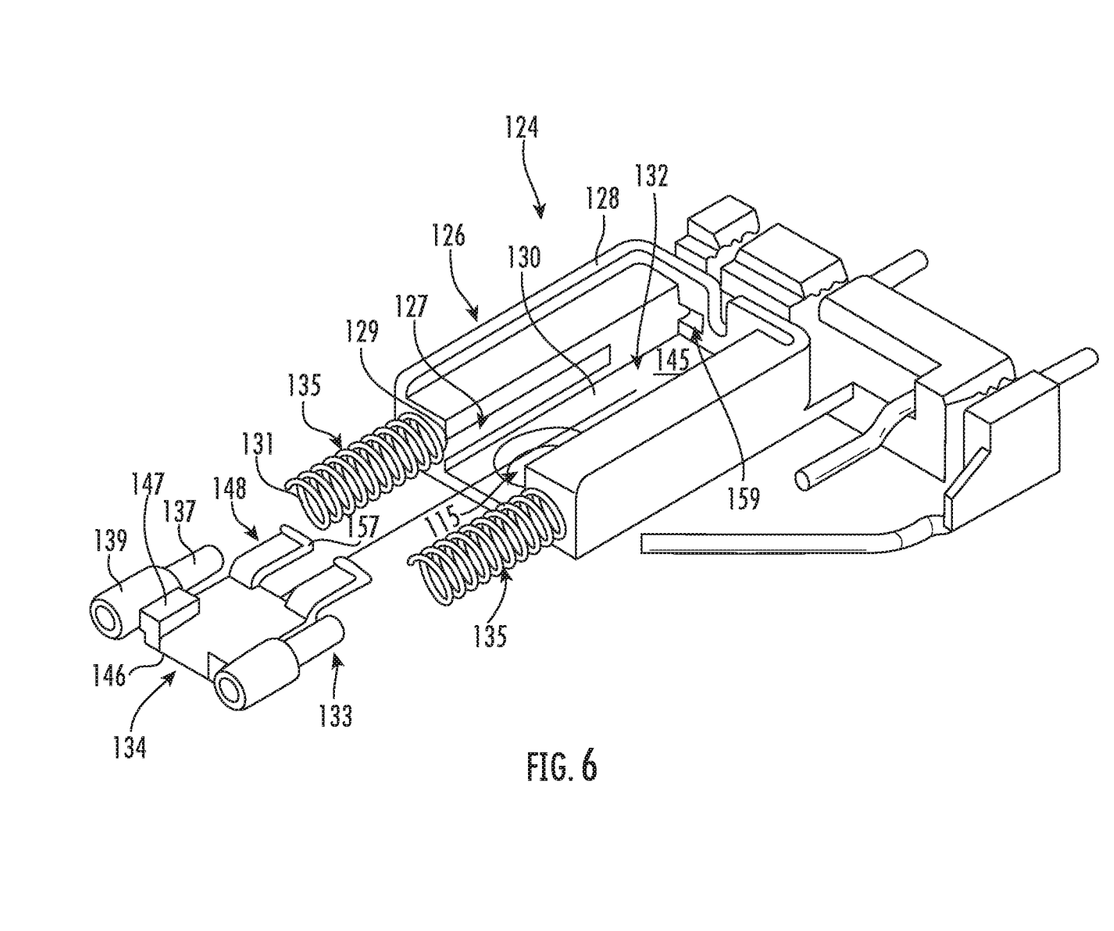
FIG. 6 is an exploded perspective view of a partial terminal assembly according to embodiments of the present disclosure.
Figure 7:
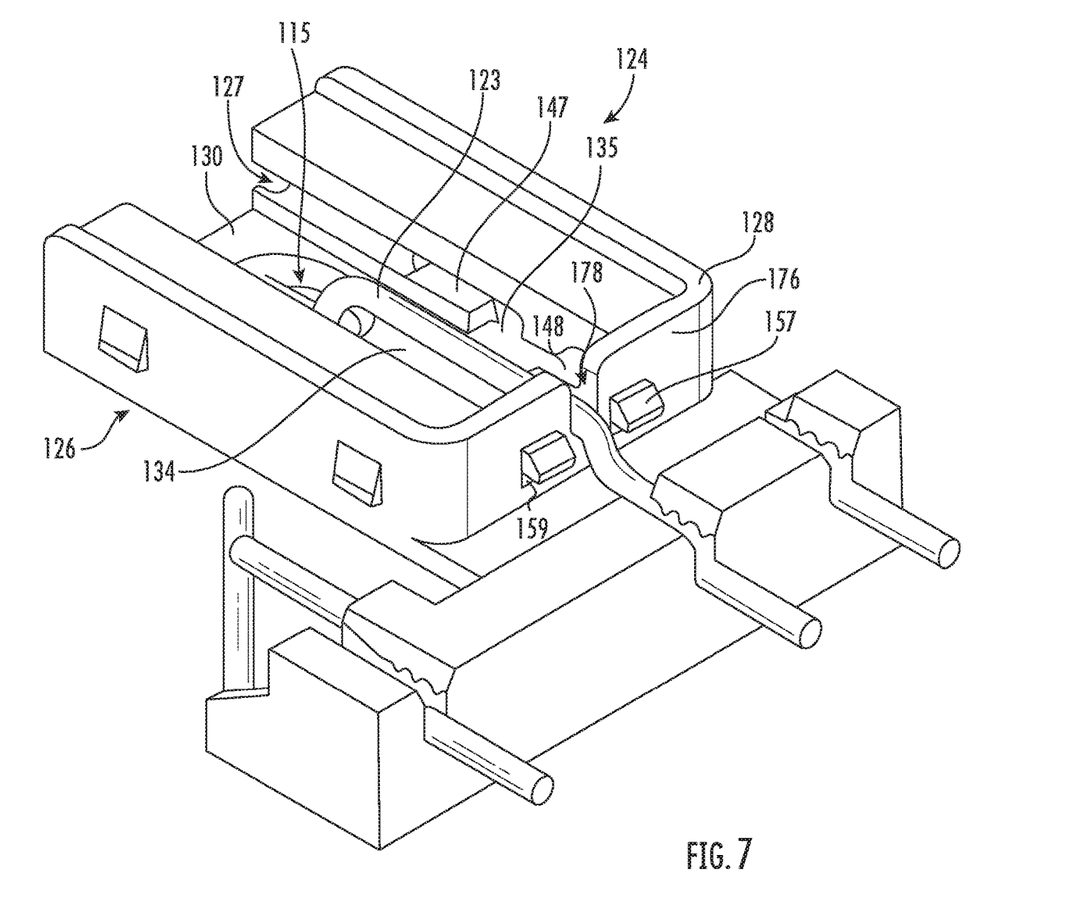
FIG. 7 is a perspective view of a partial terminal assembly according to embodiments of the present disclosure.

Turning now to FIGS. 6-7, a TMOV device (hereinafter "device") according to embodiments of the present disclosure will be described in greater detail. The device may share many or all of the same features of the device 10 shown in FIGS. 1-5 and described above. As such, only certain aspects of the device will hereinafter be described for the sake of brevity. As shown, a terminal assembly 124 is coupleable to a varistor body (not shown). In some embodiments, the terminal assembly 124 includes a housing 126 having a sidewall 128, a base 130, and a cover (not shown), wherein the sidewall 128 generally extends around the perimeter of the housing 126, e.g., along three sides. The base 130 of the housing 126 may include an opening 115 provided therein for access to a thermal electrode of the varistor body.

In the non-limiting embodiment shown, the terminal assembly 124 may include multiple spring elements 135 positioned within a set of channels 127 of the housing 126. As better shown in FIG. 6, each spring element 135 may a helical spring including a first end 129 disposed within the channel 127, and a second end 131 coupled to an arc shield slider (hereinafter "shield") 134. In some embodiments, the spring element 135 may be disposed around a set of posts 133 of the shield 134. The post 133 may include a shaft 137 and a base 139, wherein the second end 131 of the spring elements 135 are directly in abutment with the base 139 to provide a spring force against the shield 134.

In some embodiments, the shield 134 may be a substantially rectangular plate formed of an electrically non-conductive material such as plastic, glass, ceramics or a composition thereof. The shield 134 may be dimensioned to be freely slidable within the channels 127 and within a central cavity 132 defined by the base 130 and the sidewall 128 of the housing 126. For example, a first main side 146 of the shield 134 may be in abutment with an inner surface 145 of the base 130, while a should region 147 of the shield 134 may extend partially within the channels 127.

The shield 134 may further include one or more engagement members 148 extending parallel, or substantially parallel, to each shaft 137 and post 133. In the non-limiting embodiment shown, the engagement members 148 include a bent portion and a straight portion. As such, the engagement members 148 may each be a cantilevered element made of an elastic or resilient material. However, no single configuration is dispositive. As shown, the engagement members 148 may each include a protrusion or tab 157 extending from a free end thereof.

During assembly, the engagement members 148 of the shield 134 couple with the sidewall 128 of the housing 126. The sidewall 128 may include one or more openings 159 for receiving the tabs 157 therein. As shown in FIG. 7, the tabs 157 include one or more surfaces configured to engage with an exterior engagement surface 176 the sidewall 128. In some embodiments, the sidewall 128 may include an opening 178 to receive and position the third lead 123 therein. Once the engagement members 148 and tabs 157 of the shield 134 pass through the openings 159, and the spring elements 135 are compressed, the shield 134 is secured into a first, pre-working position.

Figure 8:
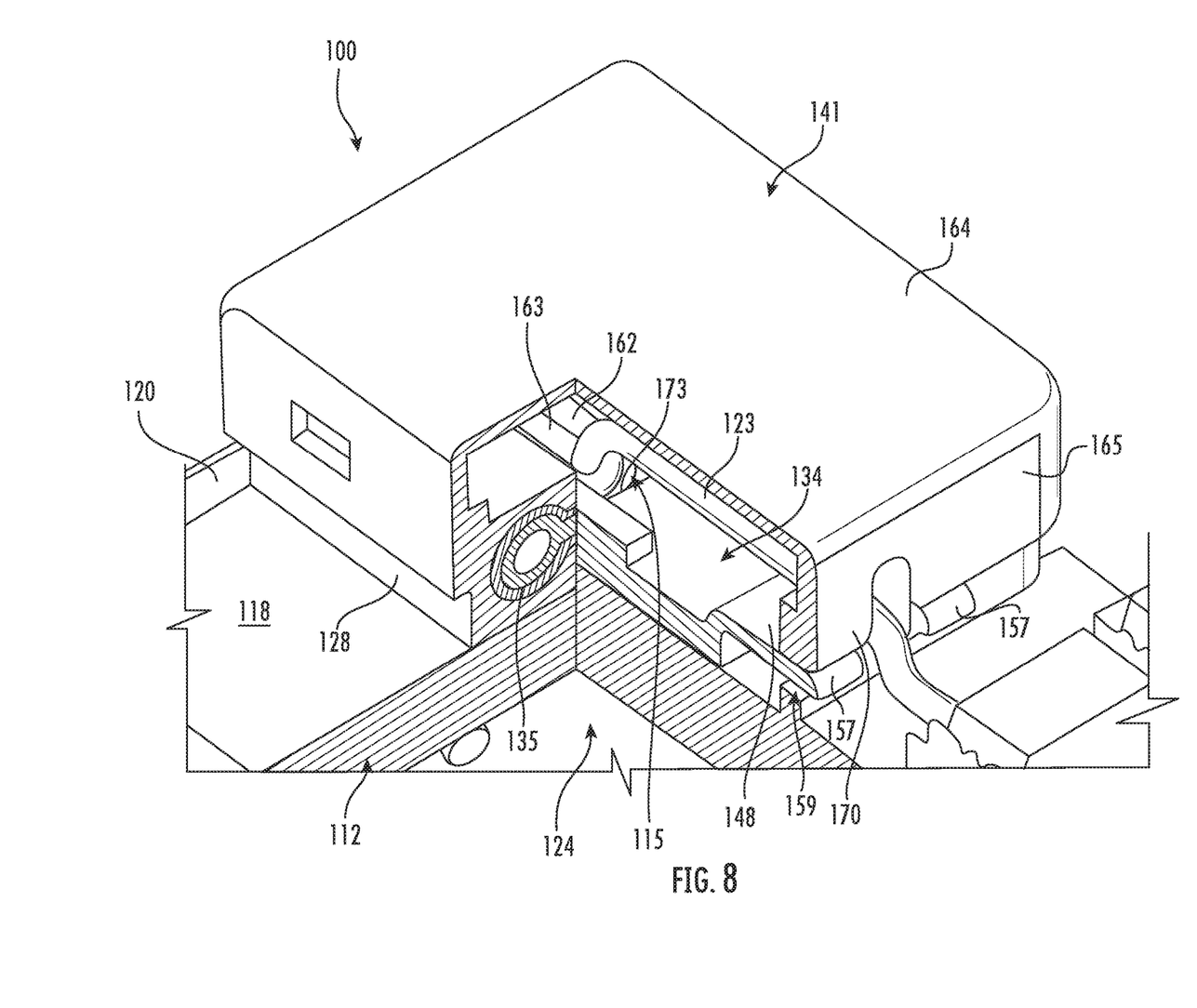
FIG. 8 is a partial cutaway view of a terminal assembly according to embodiments of the present disclosure.

Turning now to FIG. 8, the device 100 according to embodiments of the present disclosure will be described in greater detail. As shown, a portion of the cover 141 has been cutaway for ease of viewing internal components of the terminal assembly 124. In this embodiment, the third lead 123 is coupleable with a second side 120 of the varistor body 112 via a thermal linking material 162 (e.g., a low temperature solder). The thermal linking material 162 may be positioned within the opening 115 of the base of the housing 126. The thermal linking material 162 is operable to maintain direct physical contact with the third lead 123 when the thermal linking material 162 is below a melting point. Should the thermal linking material 162 exceed the melting point, for example in the event of an over-voltage condition, the third lead 123 will detach and move away from the varistor body 112, thus causing the third lead 123 to disconnect from the power supply. For example, the third lead 123 may be a spring material designed to pull away from thermal linking material 162. As the thermal linking material 162 begins to loosen, a free end 163 of the third lead 123 moves away from the base 130 of the housing 126. In exemplary embodiments, separation of the third lead 123 from the thermal electrode 118 is facilitated by the shield 134 physically moving in between the thermal linking material 162 and the third lead 123 as the shield 134 is biased away from the sidewall 128 by the spring elements 135.

In some embodiments, the shield 134 is configured to engage or abut the thermal linking material 162 when the thermal linking material 162 is above the melting point. For example, the thermal linking material 162 may extend above a plane defined by the inner surface 145 (FIG. 6) of the base 130 of the housing 126. Due to the spring force of the spring element 135, the shield 134 is biased towards the free end 163 of the third lead 123 once the tabs 157 of the engagement members 148 are disengaged from the sidewall 128. The material and dimensions of the thermal linking material 162 may be selected to adequately resist the force from the shield 134 and the spring elements 135 so that the shield 134 remains in the working position until such time that the thermal linking material 162 is heated above its melting point and softens. Once the thermal linking material 162 becomes sufficiently soft, the shield 134 begins to move into a second position wherein the shield 134 is positioned between the third lead 123 and the second side 120 of the varistor body 112, thus creating an insulation gap therebetween.

Assembly and operation of the cover 141 and the terminal assembly 124 according to embodiments of the present disclosure will now be described in greater detail. The cover 141 may include a main wall 164 and a cover sidewall 165. During assembly, the cover 141 may be secured in place after soldering the third lead 123 and the thermal linking material 162 to the varistor body 112.

The cover 141 may further include a detachment member 170 extending from the main wall 164. As shown, the detachment member 170 may be a portion of the cover sidewall 165 of the cover 141. The detachment member 170 is operable to engage the tab 157 of the engagement member 148 to release the shield 134 from engagement with the housing 126. More specifically, as the cover 141 is attached to the cover sidewall 165, the detachment member 170 depresses the tab 157 and the engagement member 148 towards the varistor body 112. The tab 157 is disengaged from the cover sidewall 165, and positioned within the opening 159 of the cover sidewall 165. The spring elements 135 may then cause the tab 157 to pass through the opening 159 and towards the thermal linking material 162. The shield 134 and the spring elements 135 are now in a first/working position in which a leading edge 173 of the shield 134 may be engaged or abut the thermal linking material 162. In the event of an over-voltage condition, the shield 134 may slide to a second position in which the opening 115 in the base 130 is physically and electrically covered by the shield 134. As a result, contact is broken between the third lead 123 and the varistor body 112.

Figure 9:
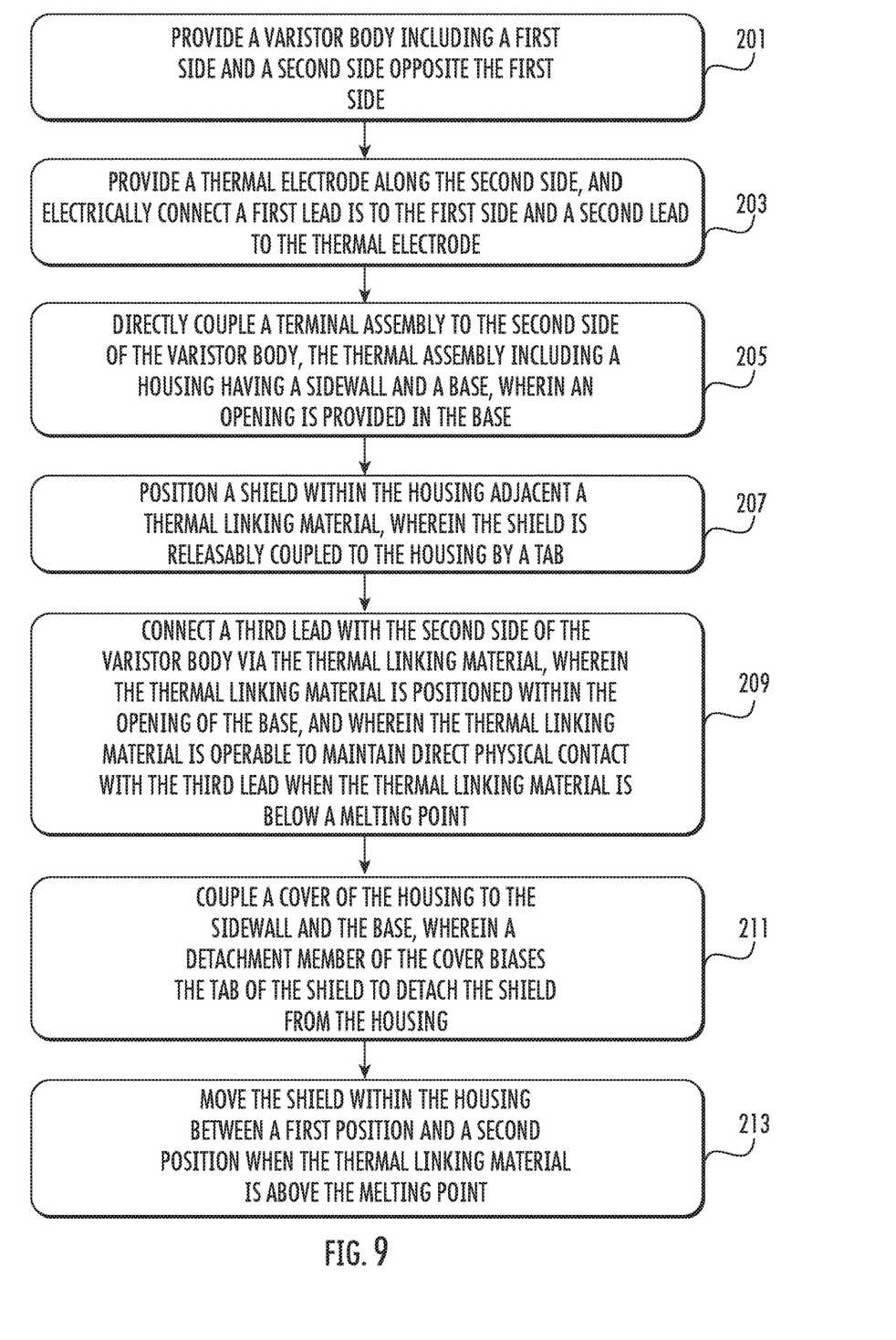
FIG. 9 is a process flow for assembling a TPV device according to embodiments of the present disclosure.

Turning now to FIG. 9, a method 200 for assembling a TPV device according to embodiments of the present disclosure will be described in greater detail. At block 201, the method 200 may include providing a varistor body including a first side and a second side opposite the first side. At block 203, the method 200 may include providing a thermal electrode along the second side, and electrically connecting a first lead is to the first side and a second lead to the thermal electrode.

At block 205, the method may include directly coupling a terminal assembly to the second side of the varistor body, the terminal assembly including a housing having a sidewall and a base, wherein an opening is provided in the base. In some embodiments, the terminal assembly the sidewall generally extends around a perimeter of the housing, and the sidewall and the base define a central cavity containing a spring element therein. The opening in the base of the housing allows access to the thermal electrode of the varistor body.

At block 207, the method 200 may include positioning a shield within the housing adjacent a thermal linking material, wherein the shield is releasably coupled to the housing by a tab. In some embodiments, the thermal linking material is connected to the thermal electrode.

At block 209, the method 200 may include connecting a third lead with the second side of the varistor body via the thermal linking material, wherein the thermal linking material is positioned within the opening of the base, and wherein the thermal linking material operable to maintain direct physical contact with the third lead when the thermal linking material is below a melting point.

At block 211, the method 200 may include coupling a cover of the housing to the sidewall and the base, wherein a detachment member of the cover biases the tab of the shield to detach the shield from the housing. In some embodiments, the detachment member is one of: a device extending from a main wall of the cover, and a cover sidewall.

At block 213, the method 200 may further include moving the shield within the housing between a first position and a second position when the thermal linking material is above the melting point. In some embodiments, in the first position the shield is positioned adjacent the thermal linking material and in the second position the shield is positioned between the third lead and the second side of the varistor body.

While the present disclosure has been described with reference to certain approaches, numerous modifications, alterations and changes to the described approaches are possible without departing from the sphere and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

What is claimed is:

1. A thermally protected varistor (TPV) device, comprising:
    a varistor body, comprising:
        a first side; and
        a thermal electrode disposed along a second side opposite the first side, wherein a first lead is electrically connected to the first side and a second lead is electrically connected to the thermal electrode; and
    a terminal assembly directly coupled to the second side of the varistor body, the terminal assembly comprising:
        a housing including a sidewall and a base, wherein an opening is provided in the base;
        a third lead coupleable with the second side of the varistor body via a thermal linking material positioned within the opening of the base, the thermal linking material operable to maintain direct physical contact with the third lead when the thermal linking material is below a melting point; and
        an arc shield movable within the housing between a first position wherein the arc shield is positioned adjacent the thermal linking material, and a second position wherein the arc shield is positioned between the third lead and the second side of the varistor body, and wherein the arc shield includes a tab for releasably coupling the arc shield to the housing;
        the housing further comprising a cover coupleable with the sidewall and the base, the cover including a detachment member operable to engage the tab of the arc shield to release the arc shield from the housing.

2. The TPV device of claim 1, further comprising a spring coupled to the arc shield, the spring operable to bias the arc shield between the first position and the second position.

3. The TPV device of claim 2, wherein the spring is positioned within a channel of the housing.

4. The TPV device of claim 1, wherein the detachment member is a device extending from a main wall of the cover.

5. The TPV device of claim 1, wherein the detachment member is a cover sidewall.

6. The TPV device of claim 1, wherein the thermal linking material melts and flows above the melting point to create an insulating gap between the third lead and the second side of the varistor body.

7. The TPV device of claim 1, the housing further comprising an intermediate wall extending from the sidewall and from the base, the intermediate wall including an opening for receiving the tab of the arc shield.

8. The TPV device of claim 1, wherein the sidewall of the housing includes an opening for receiving the tab of the arc shield.

9. A thermally protected varistor (TPV) device, comprising:
    a varistor body, comprising:
        a first side; and
        a second side opposite the first side, wherein a thermal electrode is disposed along the second side, and wherein a first lead is electrically connected to the first side and a second lead is electrically connected to the thermal electrode; and
    a terminal assembly directly coupled to the second side of the varistor body,
        the terminal assembly comprising:

a housing including a sidewall and a base, wherein an opening is provided in the base;

a third lead coupleable with the second side of the varistor body via a thermal linking material positioned within the opening of the base, the thermal linking material operable to maintain direct physical contact with the third lead when the thermal linking material is below a melting point; and a shield slidable within the housing between a first position and a second position, wherein in the first position the shield is positioned adjacent the thermal linking material and in the second position the shield is positioned between the third lead and the second side of the varistor body, and wherein the shield includes a tab for releasably coupling the shield to the housing;

the housing further comprising a cover coupleable with the sidewall and the base, the cover including a detachment member operable to engage the tab of the arc shield to release the arc shield from the housing.

10. The TPV device of claim 9, further comprising a spring coupled to the shield and to the housing, the spring operable to bias the shield from the first position to the second position when the thermal linking material melts and flows above the melting point.

11. The TPV device of claim 9, wherein the detachment member is one of: a device extending from a main wall of the cover, and a cover sidewall.

12. The TPV device of claim 9, the housing further comprising an intermediate wall extending from the sidewall and from the base, the intermediate wall including an engagement surface for engaging the tab of the shield.

13. The TPV device of claim 9, wherein the thermal linking material is a low-temperature solder.

14. The TPV device of claim 9, wherein the sidewall of the housing includes an opening for receiving the tab of the shield, and an exterior engagement surface for engaging the tab of the shield.

15. A method for assembling a thermally protected varistor (TPV) device, comprising:

providing a varistor body including a first side and a second side opposite the first side, wherein a thermal electrode is disposed along the second side, and wherein a first lead is electrically connected to the first side and a second lead is electrically connected to the thermal electrode;

directly coupling a terminal assembly to the second side of the varistor body, the terminal assembly including a housing having a sidewall and a base, wherein an opening is provided in the base;

positioning a shield within the housing adjacent a thermal linking material, wherein the thermal linking material is connected to the thermal electrode, and wherein the shield is releasably coupled to the housing by a tab;

connecting a third lead with the second side of the varistor body via the thermal linking material positioned within the opening of the base, the thermal linking material operable to maintain direct physical contact with the third lead when the thermal linking material is below a melting point; and coupling a cover of the housing to the sidewall and the base, wherein a detachment member of the cover biases the tab of the shield to detach the shield from the housing.

16. The method of claim 15, further comprising moving the shield within the housing between a first position and a second position when the thermal linking material is above the melting point, wherein in the first position the shield is positioned adjacent the thermal linking material and in the second position the shield is positioned between the third lead and the second side of the varistor body.

17. The method of claim 15, wherein the detachment member is one of: a device extending from a main wall of the cover, and a cover sidewall.

18. The method of claim 15, further comprising positioning the tab of the shield through an opening of the housing and engaging an exterior engagement surface of the housing to couple the shield to the housing.

* * * * *